United States Patent [19]

Winter

[11] 4,020,937

[45] May 3, 1977

[54] FABRICATED CLUTCH PRESSURE PLATE

[75] Inventor: Rudolph Richard Winter, Bloomfield Hills, Mich.

[73] Assignee: Borg-Warner Corporation, Chicago, Ill.

[22] Filed: Dec. 10, 1975

[21] Appl. No.: 639,339

[52] U.S. Cl. .................. 192/107 R; 192/113 A; 29/463; 85/50 R
[51] Int. Cl.² .................................... F16D 13/70
[58] Field of Search ............... 192/113 A, 107 R; 188/218 XL, 71.6, 264 A; 74/572; 301/63 DD

[56] References Cited
UNITED STATES PATENTS

| | | | |
|---|---|---|---|
| 2,217,078 | 10/1940 | Reed | 192/68 |
| 2,902,130 | 9/1959 | Halberg et al. | 192/107 R |
| 3,410,382 | 11/1968 | Root et al. | 192/107 R |
| 3,548,988 | 12/1970 | Armstrong | 192/107 R |
| 3,603,438 | 9/1971 | Hashizume et al. | 192/107 C |
| 3,635,320 | 1/1972 | Capanna | 192/107 M |
| 3,941,221 | 3/1976 | Pringle | 188/218 XL |

Primary Examiner—Benjamin W. Wyche
Attorney, Agent, or Firm—James A. Geppert

[57] ABSTRACT

A fabricated pressure plate for utilization in clutches of all kinds wherein the pressure plate is formed from sheet or roll material by stamping into two or more pieces, which pieces are assembled together and fastened mechanically or by tack-welding to improve the integrity of the final assembled plate.

16 Claims, 13 Drawing Figures

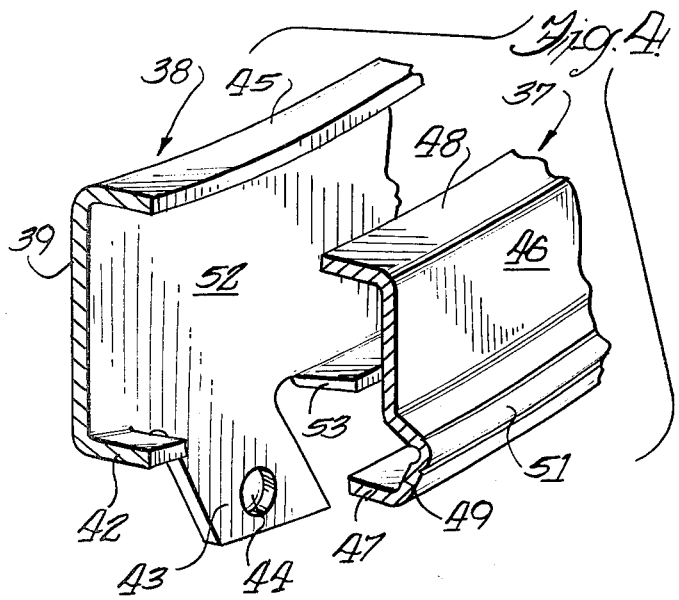
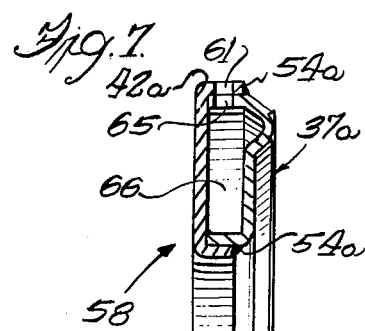
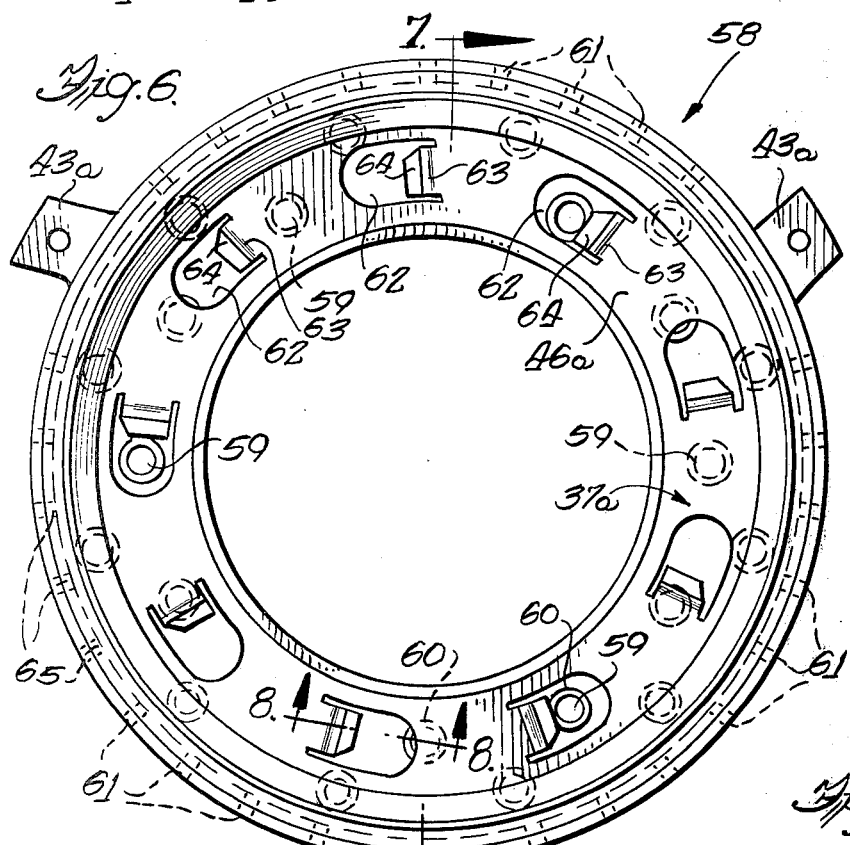
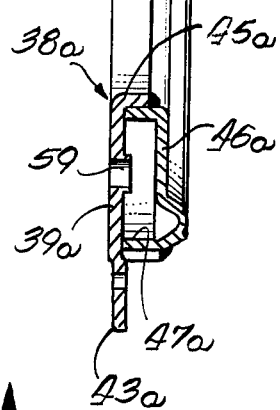
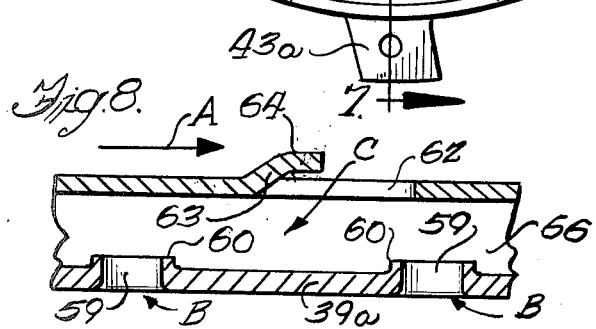
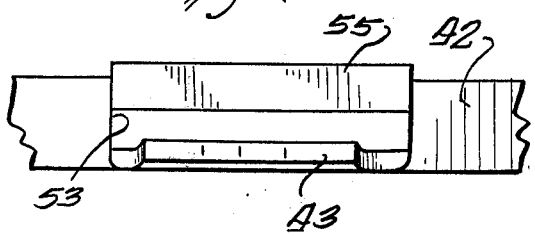

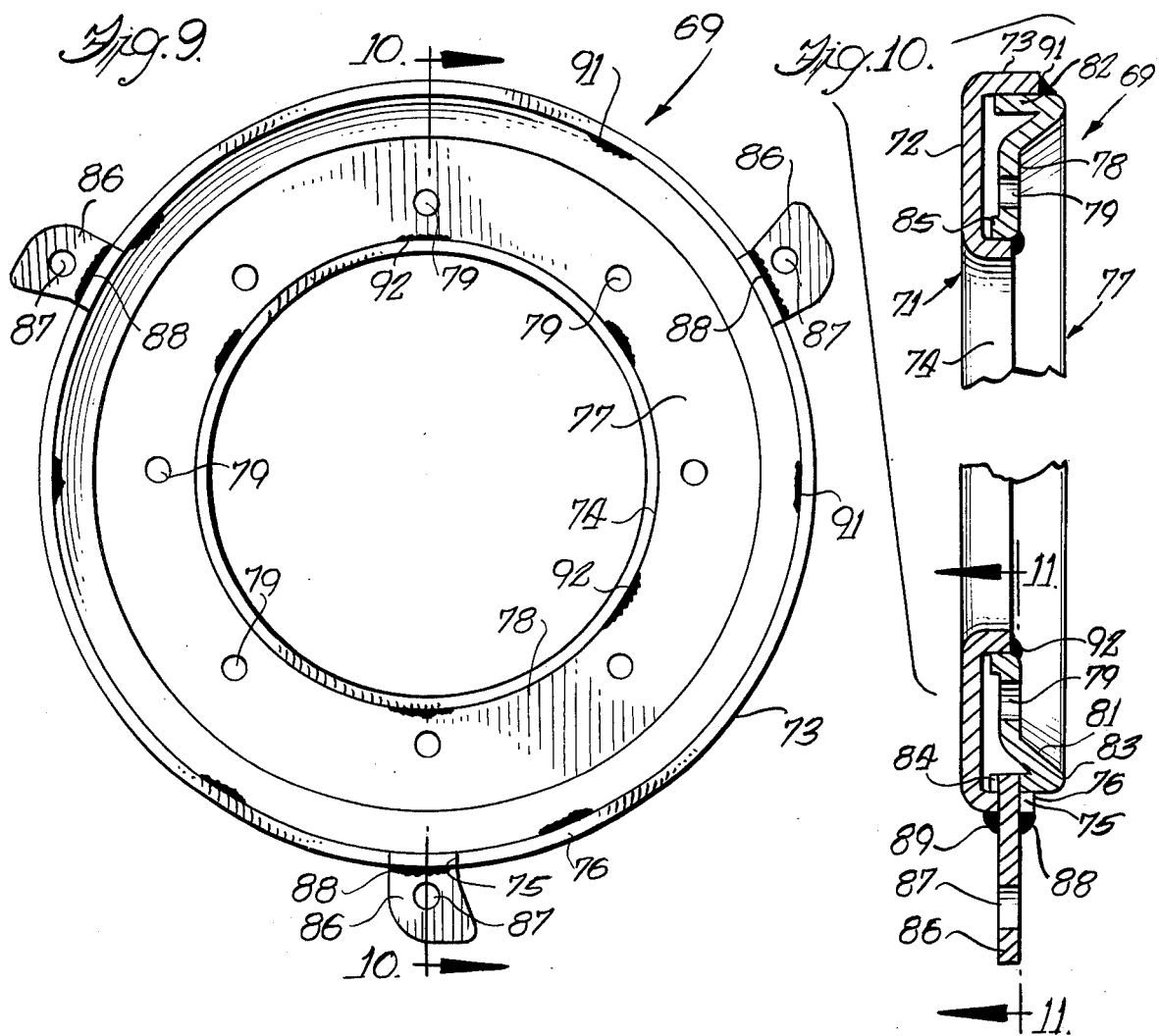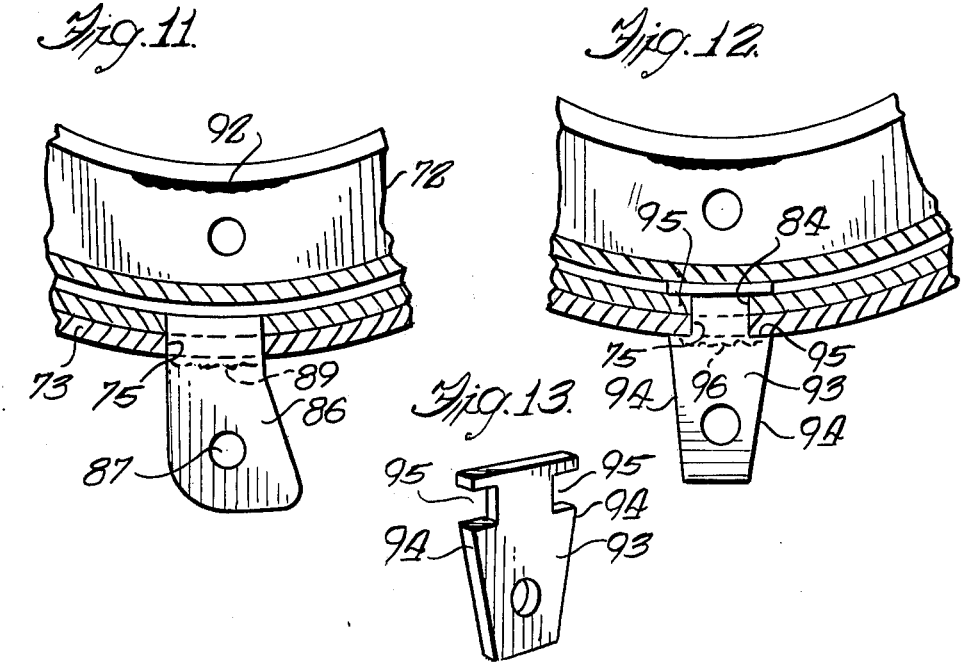

4,020,937

FABRICATED CLUTCH PRESSURE PLATE

BACKGROUND AND SUMMARY OF THE INVENTION

The present invention relates to novel clutch pressure plates and more particularly to a clutch pressure plate fabricated from several sheet steel stampings.

An automotive friction clutch today consists of a clutch cover member secured at its outer periphery to a flywheel mounted on the engine crankshaft, a clutch disc within the cover member and adapted to frictionally engage the flywheel and a pressure plate axially movable to engage one friction surface of the clutch disc and to urge the opposite friction surface against the flywheel. The clutch disc is axially movable but non-rotatably mounted on a driven shaft, and a spring plate normally urging the pressure plate against the clutch disc is located in the cover member to be actuated by a release collar mounted on said driven shaft for axial movement relative thereto to engage the spring plate and release the spring force urging the pressure plate against the clutch disc.

At the present time, clutch pressure plates are conventionally manufactured of cast iron, cast steel or other cast materials that must be formed in a foundry operation. Such a casting is subject to substantial variations in shape as produced by current foundry practice, which results in added time and cost for machining to provide a usable part and when correcting the clutch assembly incorporating this pressure plate for balance. Also, rejects due to foundry errors are a cost problem. The present invention will obviate these problems of foundry casting by providing a fabricated pressure plate.

The present invention relates to a novel clutch pressure plate that is fabricated from sheet or rolled material, such as sheet steel, where the pressure plate comprises two or more pieces formed by stamping operations. Once formed, the individual pieces are assembled and mechanically held together and may be tack-welded for positively retaining the assembly together and to provide further strength. Straightening, if required can be accomplished in a suitable press, and the friction surface, if necessary, could be lightly ground or turned.

Where considerable volume is experienced, the finished individual pieces from the stamping operation would be cleaned and loaded into hoppers or racks to be fed automatically into an assembly machine. The lugs on the friction member would be accurately located on positioning pins while the assembly is rotated and welded where necessary. The lugs for the drive straps could either be formed integral with the friction member or may be formed as separate stampings and assembled and suitably secured to the pressure plate assembly.

The fabricated pressure plate provides a hollow, light weight assembly which will have little variation in shape to affect balance of the plate and will easily meet the high speed burst requirement for clutch pressure plates.

An object of the present invention is the provision of a fabricated clutch pressure plate that is formed from sheet or rolled material in a stamping or progressive stamping operation. The pressure plate is formed of a minimum number of parts to provide a hollow member that is strong but light in weight and low in cost.

Another object of the present invention is the provision of a fabricated clutch pressure plate which is hollow but substantially imperforate for use in a wet clutch assembly.

A further object of the present invention is the provision of a fabricated clutch pressure plate for a dry friction clutch assembly formed as a hollow member with forced air inlet openings on the back side, ventilation openings on the friction facing surface and air outlet openings in the periphery of the plate.

Further objects are to provide a construction of maximum simplicity, efficiency, economy and ease of assembly and operation, ans such further objects, advantages and capabilities as will later more fully appear and are inherently possessed thereby.

DESCRIPTION OF THE DRAWINGS

FIG. 4 is an enlarged exploded partial perspective view of the pressure plate of FIGS. 2 and 3.

FIG. 5 is an elevational view taken on the edge of the pressure plate and a drive lug of FIG. 4.

FIG. 6 is an end elevational view of a second embodiment of clutch pressure plate.

FIG. 7 is a vertical cross sectional view of the pressure plate taken on the line 7—7 of FIG. 6.

FIG. 8 is a partial cross sectional view taken on the line 8—8 of FIG. 6.

FIG. 9 is an end elevational view of a third embodiment of clutch pressure plate.

FIG. 10 is a vertical cross sectional view taken on the line 10—10 of FIG. 9.

FIG. 11 is a partial cross sectional view taken on the line 11—11 of FIG. 9.

FIG. 12 is a cross sectional view similar to FIG. 11 through the pressure plate assembly showing in front elevation an alternate embodiment of drive lug.

FIG. 13 is a perspective view of the drive lug of FIG. 12.

DESCRIPTION OF THE PREFERRED EMBODIMENTS

Figure 1:
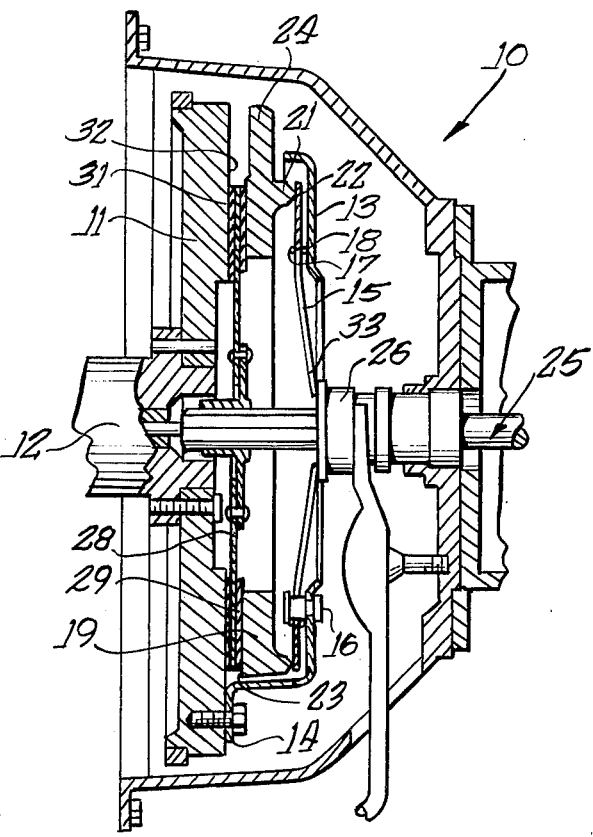
FIG. 1 is a vertical cross sectional view of an automotive vehicle clutch assembly utilizing a conventional cast iron pressure plate.

Referring more particularly to the disclosure in the drawings wherein are shown illustrative embodiments of the present invention, FIG. 1 discloses a conventional automotive vehicle clutch assembly 10 interposed between the engine and the transmission of the vehicle. The clutch assembly includes a flywheel 11 secured to the drive shaft 12 from the vehicle engine (not shown), a clutch cover 13 having radial flange portions 14 to secure the cover to the flywheel 11, a Belleville spring 15 pivotally mounted on the cover 13 by a plurality of circumferentially spaced rivets 16 secured in the cover, and a pair of wire rings 17, 18 act as fulcrum surfaces for the spring.

An annular cast iron pressure plate 19 is provided with a raised discontinuous fulcrum surface 21 adjacent its outer periphery to be engaged by the outer portion 22 of the spring 15 to urge the pressure plate surface 23 against one friction surface 31 of a clutch disc 28. The pressure plate is also provided with three circumferentially equally spaced radially extending lugs 24 adapted to be secured to drive straps (not shown) through rivets, with the opposite ends of the straps secured to the cover flange portions 14 by additional rivets. The clutch disc 28 has oppositely disposed friction surfaces 29 and 31 to engage the surface 23 of the pressure plate 19 and the surface 32 of the flywheel 11, respectively. The clutch disc is operatively connected to a driven shaft 25 leading to the vehicle transmission for rotation therewith but allowing axial movement of the clutch disc relative to the shaft.

Also, an axially movable collar 26 is adapted to engage the inner ends of the spring fingers 33 of the spring 15 such that by depressing the vehicle clutch pedal, the collar moves toward the flywheel to urge the spring fingers 33 to the left as seen in FIG. 1 and pivot the spring about the wire 17 for release of the pressure plate 19. Drive straps are conventionally provided with an offset deformation, the straps act to retract the plate 19 away from the clutch disc 28 and disengage the clutch.

As the cast iron pressure plate provides a substantial amount of weight to the clutch assembly and must be balanced and have a maximum burst strength capability, the present invention provides for the substitution of a fabricated pressure plate 36 for the cast pressure plate 19 in a wet clutch assembly. The pressure plate 36 consists of a two-part assembly having a back plate 37 and a front plate 38. The front plate is generally U-shaped in cross section with an annular pressure surface 39 facing a clutch disc 41 of the wet clutch variety, such as more clearly shown in the Borck et al. U.S. Pat. No. 3,897,860. An outer periphery has an axially extending flange 42 with three equally circumferentially spaced openings 53 from which project radial drive lugs 43 equally spaced and in a plane slightly off-set from surface 39, each lug having an opening 44 to receive suitable securing means to attach the lug to a drive strap (not shown). An inner peripheral flange 45 also extends from the pressure surface and is parallel to the outer flange 42.

The back plate 37 also is generally U-shaped in cross section with a generally flat base 46, an outer peripheral flange 47 and an inner peripheral flange 48. The base 46 has a generally semi-circular fulcrum surface 49 located adjacent the outer flange 47 and forming an annulus around the base. A fulcrum edge 51 is formed by a coining operation at the highest portion of the fulcrum surface 49 to provide accuracy and greater hardness than the remainder of the front plate.

In formation, both the back plate 37 and the front plate 38 are preferably formed from roller or sheet steel stock by progressive stamping operations. The integral lugs 43 of the front plate are initially formed slightly off-set rearwardly but in the plane with surface 39 and with notches on either side whereupon turning up of flange 42, openings 53 are provided as shown in FIG. 4. The back plate is positioned with its flanges 47 and 48 nested within the flanges 42 and 45, so that the flanges 47, 48 bottom on and abut the interior surface 52 of the pressure surface 39; the outer flange 47 closing the openings 53 in flange 42. The back plate may be tack-welded, as at 54, at several spaced locations or the two pieces may be mechanically fastened to each other to retain the parts together in a substantially imperforate hollow assembly.

Alternatively, a narrow strip of steel 55 of a length to be conformably received in an opening 53 in the flange 42 may be positioned in each opening and welded to the outer flange 47 of the back plate 37 to prevent relative rotation between the plates. As the pressure plate is loaded in the same direction as the insertion and bottoming of the back plate 37 with the front plate 38, there is little danger of separation of the two plates, and the tack-welding or the strips 55 may not be necessary in the pressure plate assembly.

As the fabricated pressure plate 36 is utilized in a wet clutch assembly as shown in U.S. Pat. No. 3,897,860 wherein the clutch disc 41 acts, when the disc is not rotating or only partially engaged and rotating at a slower speed than the flywheel, cover and pressure plate, to circulate fluid along and between the friction surfaces 56, 57 of the disc the friction surface of the flywheel (not shown) and the pressure surface 39 of the pressure plate to cool the clutch disc and pressure plate. Thus, the pressure plate 36 does not require any air or fluid circulation means.

Figure 2:
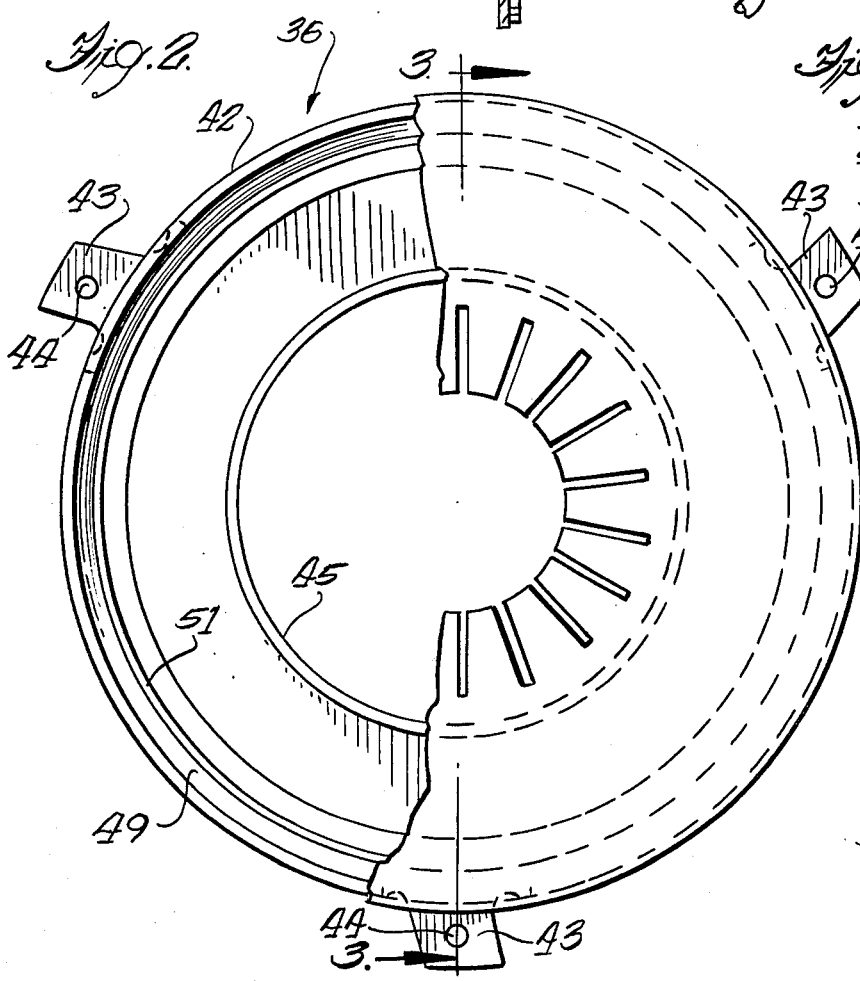
FIG. 2 is an end elevational view of a clutch pressure plate and spring utilizing a fabricated pressure plate.
Figure 3:
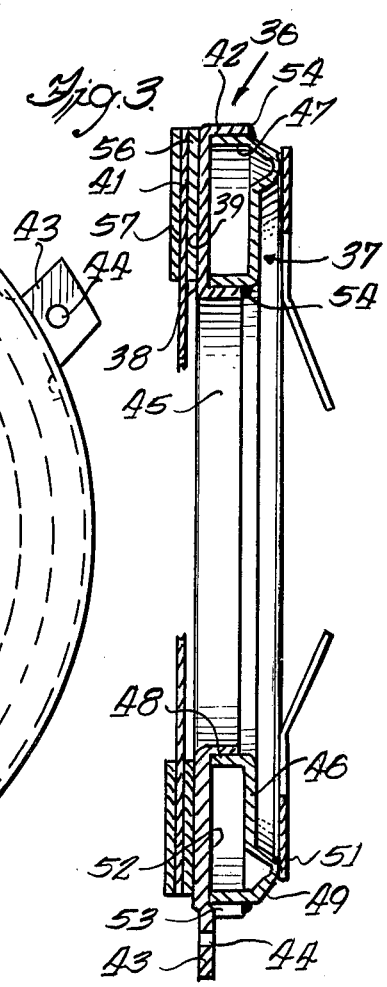
FIG. 3 is a vertical cross sectional view of the pressure plate and spring taken on the line 3—3 of FIG. 2

FIGS. 5 through 8 disclose a second embodiment of fabricated pressure plate 58 for use with a dry clutch assembly, with the parts identical to those of FIGS. 2 through 4 having the same reference numerals with a script a. This fabricated pressure plate has a back plate 37a and a front plate 38a, the front plate having a pressure surface 39a facing a fry clutch disc (not shown). Formed by piercing in the surface 39a are a plurality of circumferentially spaced openings 59 defined by inwardly extruded annular flanges 60. Also, the outer peripheral flange 42a is provided with a plurality of circumferentially spaced radial openings 61.

The back plate 37a has a base 46a provided with a plurality of circumferentially spaced elongated slots 62 which are stamped in the plate and are provided with tabs or tongues 63 extending circumferentially partially into each slot and terminating in an upwardly bent and flattened ear 64. The tabs 63 extend into the slots 62 in the same direction as the direction of rotation of the pressure plate as shown by the arrow A. The outer flange 47a is provided with circumferentially spaced radial openings 65 which are aligned with the openings 61 in the peripheral flange 42a of the front plate.

The aligned openings 61 and 65 in the plates are preferably drilled through the flanges 42a, 47a after the plates 37a, 38a are assembled. The openings are formed in three groups positioned between the drive lugs 43a integral with the front plate 38a, with each group of openings being preferably spaced at equal increments of the arc between adjacent drive lugs. The assembled plates may be retained together mechanically or by tack welds 54a and/or positioning strips 55, or as the pressure plate is loaded in the same direction as the insertion and bottoming of the back plate 37a into the front plate 38a, there is little danger of separation and the tack-welding or strips 55 may not be necessary.

Forced-through ventilation is provided for the pressure plate 58 by the pierced openings 59 in the pressure surface 39a of the front plate 38a, as shown by arrows B, and the formed up tongues 63 to scoop in air, as shown by arrows C when the plate is rotating in the direction of the arrow A. The scooped in air passes through the central cavity 66 in the pressure plate and is exhausted through the aligned openings 61, 65 in the plate periphery. The flanges 60 defining the openings 59 in the friction surface 39a allow the quick escape of frictional heat into the interior of the plate 58 along with the rapid transfer of heat through the thickness of metal; the toal heat to be swept outward through the peripheral holes 61, 65 by the incoming air.

FIGS. 9 through 11 disclose a third embodiment of fabricated pressure plate 69 formed of five pieces instead of the two-piece construction of the previous plates. This pressure plate includes a front plate 71 having a friction surface 72, an outer peripheral flange 73, and an inner peripheral flange 74 which may be of less depth than the flange 73. The outer flange is provided with three circumferentially equally spaced notches 75 formed in the edge 76.

A back plate 77 is provided with a relatively flat base portion 78 having a plurality of circumferentially spaced openings 79 therein and terminating in an outwardly and upwardly inclined portion 81 intersecting an outer peripheral flange 82 in a fulcrum surface 83. The outer flange 82 is provided with three circumferentially equally spaced notches 84 adapted to be aligned with the notches 75 in the front plate 71. The back plate also has an inner peripheral flange 85; the flanges 82 and 85 being spaced by a dimension to be conformably received within the flanges 73 and 74 of the front plate.

Three drive lugs 86 are of a width to be received in the aligned notches 75 and 84, and each has an opening 87 for securing the lug to a drive strap (not shown). In assembly, the drive lugs 86 are fitted in the notches 84 of the back plate 77 and the front plate 71 is assembled over the back plate as shown in FIG. 10 with the notches 75 receiving the drive lugs. The drive lugs are welded on both upper and lower surfaces at 88 and 89, and the back plate 77 and the front plate 71 are welded together at spaced locations 91 and 92 at the outer and inner peripheries, respectively, or may be mechanically fastened together.

As in the previous embodiments, the front plate and back plate, as well as the drive lugs, are stamped out of sheet material, with the front plate and back plate preferably being formed in a progressive stamping operation. The drive lugs are stamped from what would previously be considered as scrap material.

FIG. 12 shows an alternate embodiment of drive lug 93 wherein the sides 94, 94 of the lug are spaced a distance greater than the width of the aligned notches 75 and 84 in the flanges 73 and 82. Formed in each edge 94 is a secondary notch 95 which is adapted to receive the edges of the flanges 73, 82 to accurately and positively position the lug in the assembly. Here again, the lug is welded to the pressure plate as at 96.

Obviously, the back plate may have various configurations to form the fulcrum surface and may have extruded or lanced dimples acting as height locators for the plate in the assembly. In a volume operation, the formation and assembling of the pressure plate parts would easily lend itself to automation. Thus, a pressure plate assembly can be manufactured of greater strength, lighter weight, lower cost and consistent quality. Also, it should be understood that the choice of using a ventilated versus a non-ventilated pressure plate will depend upon the nature of the service in which the clutch is used. Obviously the more severe the service, the more cooling is required whether by air, oil or a combination of both.

I claim:

1. A fabricated clutch pressure plate comprising an annular front plate and an annular back plate stamped out of sheet metal, each plate having a relatively flat annular base portion terminating an inner and outer peripheral flanges, the width of said back plate across the flanges being substantially equal to the interior width of the base of the front plate, said plates being assembled in nesting frictional engagement forming a central annular hollow chamber, and circumferentially spaced radially extending drive lugs mounted on said assembled pressure plate.

2. A fabricated clutch pressure plate as set forth in claim 1, in which said drive lugs are formed integral with the front plate, said base portion of said front plate forming a friction surface, the plane of which is substantially parallel with the plane of the drive lugs.

3. A fabricated clutch pressure plate as set forth in claim 2, in which said drive lugs are initially formed with notches on each side which, when the outer peripheral flange is formed, define openings in said flange abridging said lugs.

4. A fabricated clutch pressure plate as set forth in claim 1, in which said back plate has a base portion including an annular raised continuous fulcrum surface adjacent the outer peripheral flange thereof, said fulcrum surface having a relatively sharp fulcrum radius.

5. A fabricated clutch pressure plate as set forth in claim 4, in which said fulcrum surface is generally semicircular in cross section, and said fulcrum edge is coined therein.

6. A fabricated clutch pressure plate as set forth in claim 1, in which said pressure plates are imperforate when used in a wet cloth.

7. A fabricated clutch pressure plate as set forth in claim 1, in which the friction surface of the front plate has a plurality of circumferentially spaced openings therein, the base portion of the back plate has a plurality of circumferentially spaced elongated slots, and the outer peripheral flanges of the assembled front plate and back plate have a plurality of radially extending openings therein for the flow of air into and through the central chamber thereof.

8. A fabricated clutch pressure plate as set forth in claim 7, in which the base portion of the front plate has a plurality of inwardly extending extruded annular flanges defining said first-mentioned openings.

9. A fabricated clutch pressure plate as set forth in claim 7, including a plurality of circumferentially extending tabs projecting into said slots at one end thereof, the free end of each tab being bent outwardly from the base portion.

10. A fabricated clutch pressure plate as set forth in claim 9, wherein said tabs extend in the directon of rotation of said pressure plate so as to act as air scoops to direct air flow through the slots into the central chamber.

11. A fabricated clutch pressure plate as set forth in claim 10, wherein said radial openings are located in sets of equal spacing between each of said drive lugs for egress of air therethrough.

12. A fabricated clutch pressure plate as set forth in claim 3, including metallic strips conformably received in said peripheral openings and suitably secured to the outer periphery of said back plate to prevent relative roration between said plates.

13. A fabricated clutch pressure plate as set forth in clam 1, in which said drive lugs are formed separate from said front plate and back plate, the outer peripheral flanges of said front plate and back plate having radially aligned circmferentially equally spaced openings receiving the inner ends of said drive lugs, said lugs being welded on their upper and lower surfaces to said front plate outer flange.

14. A fabricated clutch pressure plate as set forth in claim 13, wherein each drive lug is of a width so as to be conformably received in said openings.

15. A fabricated clutch pressure plate as set forth in claim 13, wherein each drive lug is of a width greater than the length of said openings, the opposite edges of each lug having aligned notches adapted to receive the edges of the outer peripheral flanges of the front plate and back plate.

16. A fabricated clutch pressure plate as set forth in claim 1, in which said front plate and back plate are welded together at circumferentially spaced locations on the inner and outer peripheries thereof.

* * * * *

UNITED STATES PATENT OFFICE
CERTIFICATE OF CORRECTION

PATENT NO. : 4,020,937

DATED : May 3, 1977

INVENTOR(S) : Rudolph Richard Winter

It is certified that error appears in the above-identified patent and that said Letters Patent are hereby corrected as shown below:

Column 6, line 2, change "terminating an" to -- terminating in --.

Signed and Sealed this ninth Day of August 1977

[SEAL]

Attest:

RUTH C. MASON
Attesting Officer

C. MARSHALL DANN
Commissioner of Patents and Trademarks